United States Patent [19]
Brueckner et al.
[11] 4,079,255
[45] Mar. 14, 1978

[54] X-RAY SYSTEM WITH ELECTROPHORETIC IMAGING AND SOLID X-RAY ABSORBER

[75] Inventors: Keith A. Brueckner, La Jolla; John H. Lewis, Los Angeles, both of Calif.
[73] Assignee: Xonics, Inc., Van Nuys, Calif.

[21] Appl. No.: 722,091
[22] Filed: Sep. 10, 1976
[51] Int. Cl.[2] ........ G03B 41/16
[52] U.S. Cl. ........ 250/315 A
[58] Field of Search ........ 250/315 A

[56] References Cited

U.S. PATENT DOCUMENTS 3,939,345 2/1976 Allan et al. ........ 250/315 A
3,965,352 6/1976 Allan et al. ........ 250/315 A Primary Examiner—Archie R. Borchelt
Attorney, Agent, or Firm—Harris, Kern, Wallen & Tinsley

[57] ABSTRACT

An electronradiography imaging chamber providing a real time visual image. An electronradiography imaging chamber with a solid X-ray absorber at one electrode and with electrophoretic particles in the gap between the electrodes, with the particles being selectively moved to a transparent electrode as a result of the electrostatic charge image formed by absorption of incoming X-ray radiation in the solid absorber. An imaging chamber which can be cyclically operated at a relatively high repetition rate, typically 10 to 20 images per second, thereby providing real time viewing of the objects.

17 Claims, 13 Drawing Figures

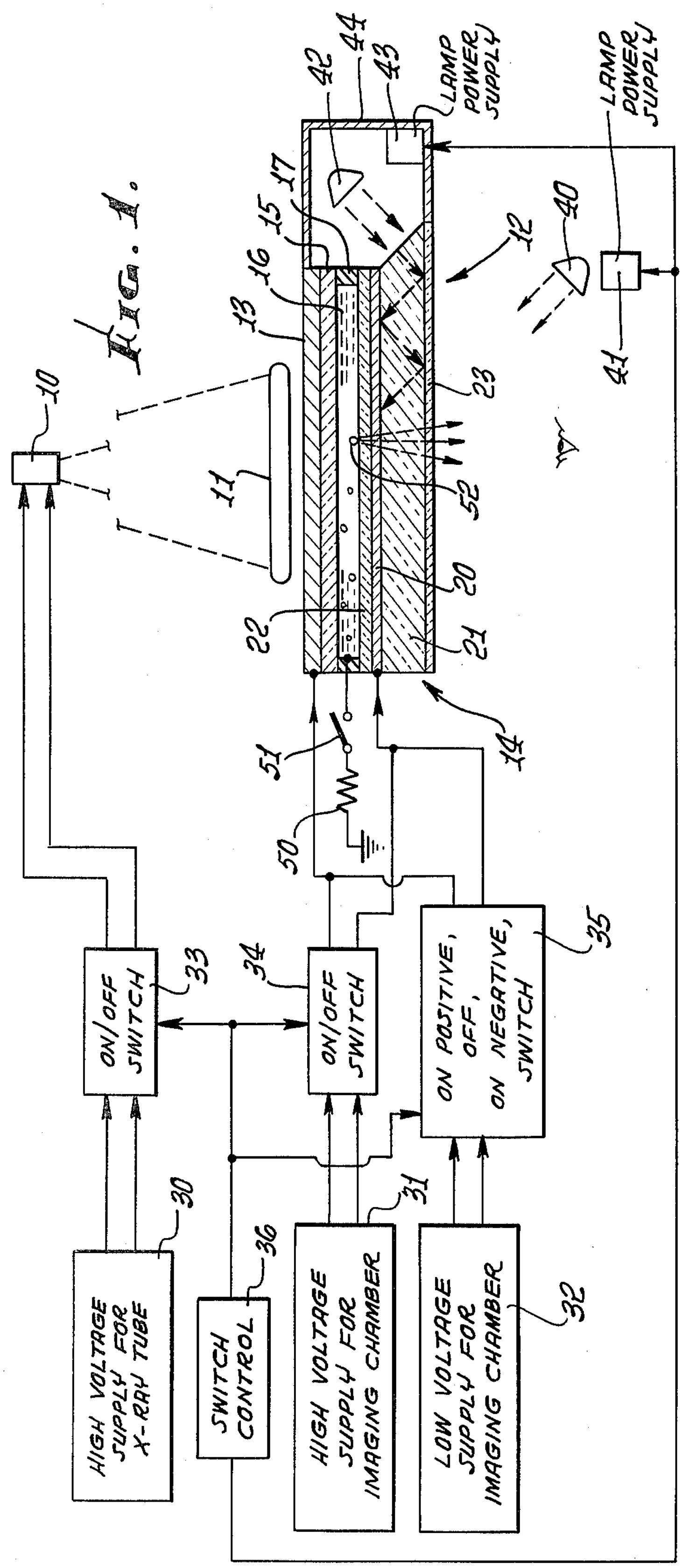
FIG. 1.
HIGH VOLTAGE SUPPLY FOR X-RAY TUBE
SWITCH CONTROL
HIGH VOLTAGE SUPPLY FOR IMAGING CHAMBER
LOW VOLTAGE SUPPLY FOR IMAGING CHAMBER
ON/OFF SWITCH
ON/OFF SWITCH
ON POSITIVE, OFF, ON NEGATIVE, SWITCH
LAMP POWER SUPPLY
LAMP POWER SUPPLY
10
11
12
13
14
15
16
17
20
21
22
23
30
31
32
33
34
35
36
40
41
42
43
44
50
51
52
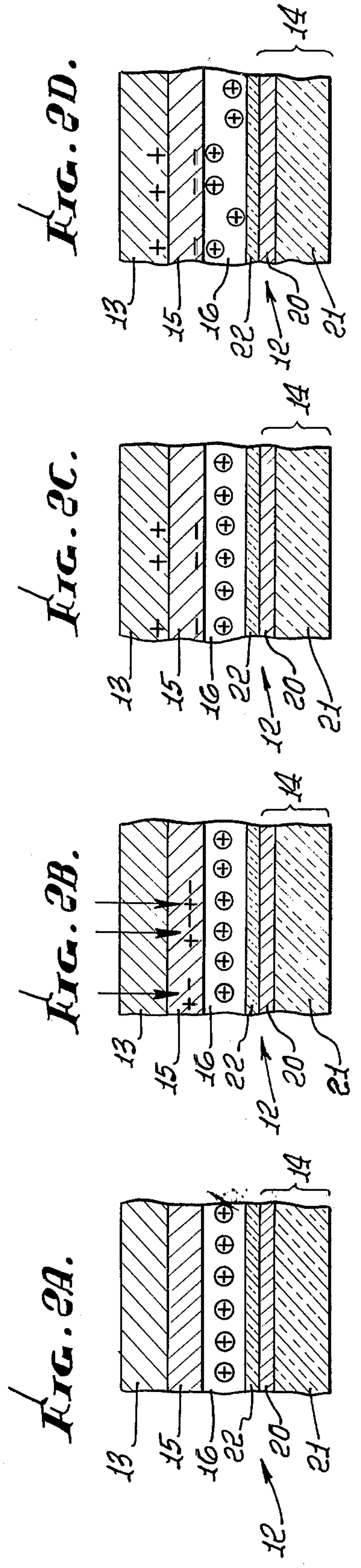
FIG. 2A.
FIG. 2B.
FIG. 2C.
FIG. 2D.
12
13
14
15
16
20
21
22

X-RAY SYSTEM WITH ELECTROPHORETIC IMAGING AND SOLID X-RAY ABSORBER su

BACKGROUND OF THE INVENTION

This invention relates to electronradiography and in particular, to X-ray systems providing for real time imaging. The present invention is an improvement on that disclosed in copending application entitled X-RAY SYSTEM WITH ELECTROPHORETIC IMAGING, Ser. No. 571,220, filed Apr. 24, 1975, now U.S. Pat. No. 3,965,352.

In the aforesaid copending application, an electronradiography imaging chamber has first and second electrodes mounted in spaced relation with a gap therebetween, with a fluid in the gap. The fluid is an X-ray absorber which emits electrons and positive ions as a function of incoming X-ray radiation. Electrophoretic particles are suspended in the fluid in the gap, and an appropriate electrical power supply is provided for connection across the electrodes. An electrostatic charge image is formed at the edge of the gap during X-ray radiation and this charge image is utilized in selectively depositing electrophoretic particles at one of the electrodes which is transparent for viewing the deposited particles through the electrode. Several arrangements for the electrophoretic particles and the fluid, and several arrangements for viewing of the electrophoretic particle image are disclosed.

It is an object of the present invention to provide a new and improved electronradiography imaging chamber which utilizes a solid absorber in place of the previously disclosed fluid absorber.

SUMMARY OF THE INVENTION

The imaging chamber of the present invention includes first and second electrodes in spaced relation with a gap therebetween. An optional dielectric layer may be provided at the surface of one of the electrodes and an absorber sheet is positioned at the surface of the other electrode. Electrophoretic particles are dispersed in a liquid in the gap. The absorber sheet provides for absorption of incoming X-ray radiation and produces electrons and positive ions, and typically is a solid state photoconductor material. An appropriate electrical power supply is provided for connection across the electrodes. An electrostatic charge image is formed at a surface of the solid absorber during X-ray radiation, and this charge image is utilized in the same manner as in the prior art in selectively depositing the electrophoretic particles at one of the electrodes. The image formed by the deposited electrophoretic particles may be viewed in any of the conventional modes. The X-ray exposure and image viewing steps may be repeated cyclically to provide substantially continuous real time imaging.

BRIEF DESCRIPTION OF THE DRAWINGS

FIG. 1 is a diagramatic illustration of an electronradiography system with an imaging chamber incorporating the presently preferred embodiment of the invention;

FIGS. 2A–2D are diagramatic illustrations of the electrode construction of the chamber illustrating one mode of operation;

DESCRIPTION OF THE PREFERRED EMBODIMENTS

Figure 3:
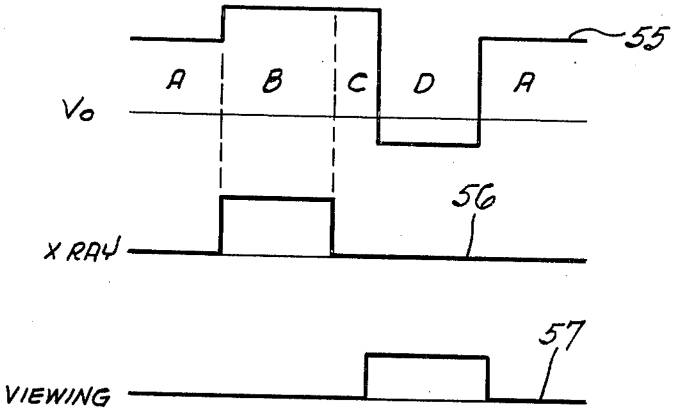
FIG. 3 is a timing diagram for FIGS. 2A–2D.

In the electron radiography system of FIG. 1, an X-ray source 10 directs radiation through a body 11 to an imaging chamber 12. The imaging chamber includes an upper electrode 13 and a lower electrode 14 separated by spacers 17 defining a gap 16 between the electrodes.

The upper electrode 13 should be of a material which is relatively transparent to X-ray radiation and beryllium is a preferred metal. The lower electrode 14 should be relatively transparent optically and typically may comprise a thin transparent film 20 of an electrical conducting material such as a metal oxide on a glass or plastic support plate 21. A dielectric film 22 may be applied on the gap surface of the electrode film 20, and typically may be a thin plastic sheet. Said dielectric film serves as an electric discharge inhibitor when high voltage is applied across electrodes 13 and 20. If desired, a conventional non-reflecting film 23 may be applied on the outer surface of the support plate 21.

Electrical power supplies are provided for the X-ray source and the imaging chamber and typically may include a high voltage supply 30 for the X-ray tube, a high voltage supply 31 for the imaging chamber, and a low voltage supply 32 for the imaging chamber. The voltage supply to the X-ray source 10 is controlled by an on-off switch 33. The voltage supply to the imaging chamber 12 is controlled by an on-off switch 34 and another switch 35 which can provide a positive supply, a negative supply and an off condition. The sequence of operation of the switches 33, 34, 35 is controlled by a switch control unit 36.

The image formed in the chamber 12 may be viewed by transmitted light if both electrodes are optically transparent, by reflected light or by scattered light. These three modes of viewing are set out in detail in the aforesaid copending application Ser. No. 571,220. FIG. 1 illustrates a lamp 40 energized from a power supply 41 directing light onto the electrode 14 for reflection illumination. Another lamp 42 energized from a power supply 43 is mounted in a closed housing 44 at one edge of the imaging chamber for directing light into the plate 21 to provide dark field illumination and scattered light viewing.

A sheet 15 is positioned at the surface of the electrode 13 facing the electrode 14. This sheet is formed of a semiconductor material, typically a photoconductor such as selenium, lead oxide, cadmium sulfide, mercury iodide or cesium iodide, and functions as an X-ray absorber and electron and positive ion source. Electrophoretic particles 52 are suspended or dispersed in a dielectric liquid in the gap 16.

One mode of operation of the system of FIG. 1 is illustrated in FIGS. 2 and 3, with the horizontal axis of the timing diagram of FIG. 3 representing time with one cycle of operation divided into segments A, B, C and D. The voltage across the electrodes is represented by curve 55, the X-ray source on time is represented by the curve 56, and the viewing time is represented by the curve 57. At the end of time segment A, there is a low voltage across the electrodes and the electrophoretic particles 52 are dispersed in the liquid spaced from the sheet 15 and film 22. In time segment B, the X-ray source is energized and a high voltage is connected across the electrodes with the electrode 14 negative. Incoming X-rays are absorbed in the sheet 15 and electrons (or negative ions) and positive ions are generated, as indicated in FIG. 2B. The electrons are rapidly moved toward the electrode 13 and the positive ions are rapidly moved toward the electrode 14 under the influence of the field through the gap, providing the electrostatic charge image is as shown in FIG. 2C. The electrostatic charge images remain after the X-ray source is turned off. The voltage across the electrodes is reversed in time segment D and the positively charged electrophoretic particles are attracted toward thhe electrode 14 at those portions which have negative ions thereon. The remaining positively charged electrophoretic particles are moved toward the electrode 14 by the applied field. This selective depositing of the particles as shown in FIG. 7D provides the desired image which can be viewed during the time segment D.

At the end of the viewing time, the potential across the electrodes is reversed, as indicated in FIG. 2A, to move the particles back into the dispersion. A typical exposure and viewing cycle may occur in one-tenth of a second, providing ten viewing frames per second. It is desirable to discharge any remaining charge in the liquid before the next X-ray exposure and this may be accomplished by providing an electrical connection from the liquid to ground through a resistor 50 and a switch 51 (FIG. 1). The switch 51 may be closed during time segment A to accomplish the discharge. Alternatively, the switch 51 may be omitted with a direct connection through the resistor to circuit ground, with the parameters chosen so that the ground connection does not adversely affect the operation during X-ray exposure but does accomplish the desired discharge function.

It will be readily understood that the specific voltages shown in curve 55 are not required and that various other voltage application schemes can be utilized.

Figure 7:
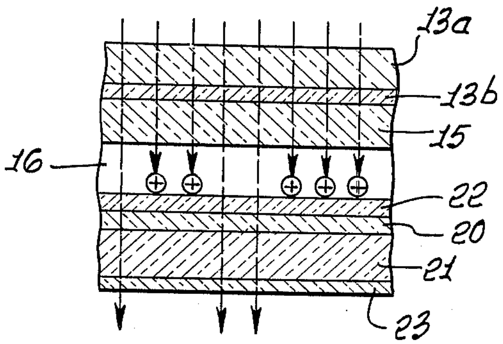
FIG. 7 is a partial sectional view of an imaging chamber illustrating an alternative type of illumination for viewing.

A transillumination mode of viewing is shown in FIG. 7. Light enters the gap 16 through the electrode 13 and sheet 15, with light being blocked by the deposited particles and passing through the electrode 14 in areas not blocked by deposited particles. For this mode, the electorde 13 and sheet 15 need to be relatively transparent. Typically the electrode 13 may comprise a glass plate 13*a* with a thin electrical conducting film 13*b* on the inner surface.

The structure of FIG. 1 may be used for a reflection illumination mode of viewing with light directed from the lamp 40 onto the electrode 14 and being reflected by deposited particles. This mode is preferred for use when taking photographs of the image, since it provides a relatively high illumination.

The structure of FIG. 1 also may be used for a dark field illumination mode of viewing. A light wave of substantially total internal reflection is produced in the plate 21. This may be achieved by introducing light from the lamp 42 into the edge of the plate 21 at the appropriate angle for achieving internal reflection at the interfaces. When a small particle rests on the external surface at the reflection interface, it will disrupt the incident internal wave and scatter the radiation, thus becoming a point source of light when viewed from the exterior of the imaging chamber. Other locations on the inner surface of the electrode 14 which do not have a particle to serve as a scattering center will appear black if the electrode 13 is opaque.

The dark field illumination mode is preferred for direct viewing of the image, since it can be obtained with fewer deposited particles and a lower X-ray dosage. When it is desired to make a spot film or photograph of the image, the system may be switched to the reflection illumination mode with the X-ray dosage increased for a single pulse, thus creating a higher electrostatic charge and greater particle deposit at the viewing window. During this time, the lamp power supply 41 may be turned on to energize the lamp 40, rather than the lamp power supply 43. This switching may be accomplished by the switch control unit 36.

Figure 4A:
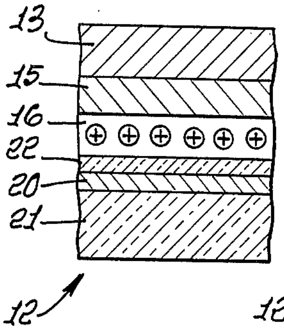
FIGS. 4A–4D are similar to FIGS. 2A–2D illustrating another mode of operation.
Figure 4B:
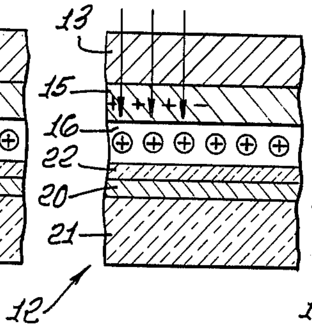
Figure 4C:
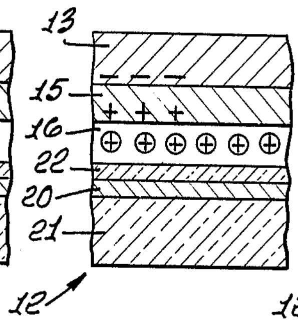
Figure 4D:
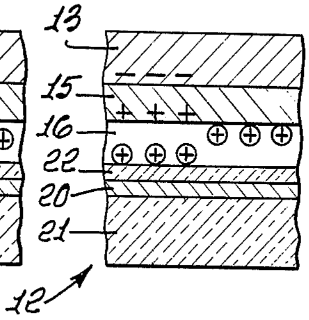
Figure 5:
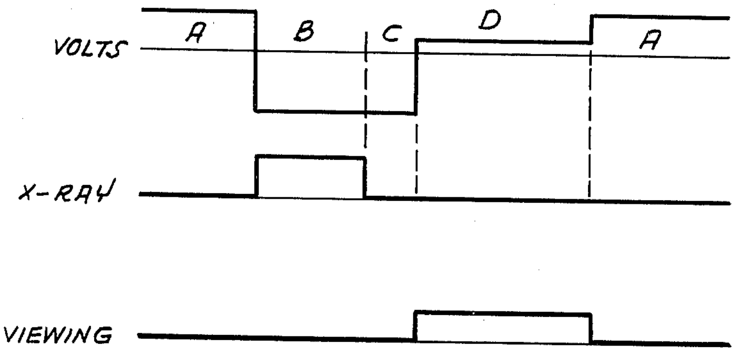
FIG. 5 is a timing diagram for FIGS. 4A–4D.

An alternative mode of operation is illustrated in FIGS. 4A–4D and 5. In time segment A, a low voltage is applied across the electrodes with the electrode 14 negative. In time segment B, a high voltage of the opposite polarity is connected across the electrodes and the incoming X-rays produce the electrons and positive ions, which are then attracted to the corresponding electrodes producing the electrostatic images as shown in FIG. 4C. The potential across the electrodes is then reversed to a relatively low value and the positive ions at the sheet 15 attract particles for deposit on the sheet, while particles not attracted are moved to the electrode 14. This is illustrated in FIG. 4D. Typical timing curves for this mode are shown in FIG. 5. The various modes of operation specifically described herein are for illustrative purposes and other modes of operation will readily be apparent to those understanding the specifically described modes.

Figure 6:
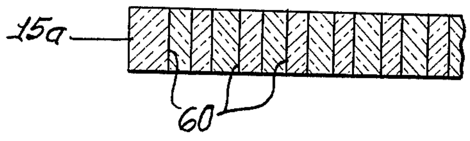
FIG. 6 is a partial sectional view showing an alternative construction for the solid absorber of the imaging chamber of FIG. 1.

The sheet 15 is illustrated in FIG. 1 as a solid layer of the absorber material. One alternative form is shown in FIG. 6, comprising a sheet or plate 15*a* of a dielectric such as glass or plastic, with a plurality of passages or holes 60 therethrough, with the absorber material filling the holes. This arrangement provides improved resolution, limiting lateral movement of ions and hence preventing crosstalk.

Electrophoretic particles and dispersions are not new per se, and typical examples are given in U.S. Pat. No. 3,668,106. Light colored particles in a dark liquid and dark particles in a light or colorless liquid may be utilized, depending upon the type of display desired. A particle may comprise a metallic oxide pigment or a carbon pigment or titanium oxide coated with a colorless resin to provide the bulk and for controlling the charge. While positively charged particles have been utilized in the preceding discussion, negatively charged particles and neutral particles may also be utilized. Typically the particles are of the order of one micron in diameter and dispersed in the diluent in the ratio of approximately one percent by weight. At the present time, positively charged particles are more readily obtained and controlled. The liquid containing the particles should be relatively dense to help prevent precipitation of the particles. Typical suitable liquids are dibromotetrafluoroethane and di-iodomonofluoromethane. Other standard dispersent liquids such as isopar may be used.

We claim:

1. In an electronradiograph imaging chamber for providing a visual image, the combination of:

first and second electrodes;

means for supporting said electrodes in spaced relation with a gap therebetween, with said first electrode being relatively transparent optically;

a solid absorber sheet including an X-ray absorber and electron and positive ion emitter and positioned at the surface of said second electrode facing said first electrode, with X-ray radiation entering said absorber sheet being absorbed and providing electrons and positive ions therein;

a plurality of electrophoretic particles dispersed in a liquid in said gap; and means for connecting an electric power source across said electrodes for attracting electrons toward one electrode and positive ions toward the other depending upon the polarity of the power source and forming an electrostatic charge image, with said particles being selectively deposited at said first electrode as a function of said electrostatic charge image forming a visual image viewable through said first electrode.

2. An imaging chamber as defined in claim 1 wherein said absorber sheet is formed of a photoconductor.

3. An imaging chamber as defined in claim 1 wherein said absorber sheet is formed of at least one of selenium, lead oxide, cadmium sulfide, mercury iodide and cesium iodide.

4. An imaging chamber as defined in claim 1 wherein said absorber sheet comprises a dielectric support with a plurality of spaced passages therethrough, with said passages carrying the absorber material.

5. An imaging chamber as defined in claim 1 wherein said second electrode is relatively transparent optically, and including means for directing light through said electrodes with the deposited particles blocking light transmission.

6. An imaging chamber as defined in claim 1 including means for directing light onto said first electrode with the deposited particles reflecting light.

7. An imaging chamber as defined in claim 1 wherein said first electrode includes a support plate with an electrically conducting layer thereon, and including first means for directing light into said plate from an edge with the deposited particles scattering light.

8. An imaging chamber as defined in claim 7 with said light directed into said plate at an angle to produce substantially total reflection of the light internally of the plate except for that scattered by the deposited particles.

9. An imaging chamber as defined in claim 8 including:

second means for directing light onto said first electrode with the deposited particles reflecting light; and means for selectively energizing said first and second light directing means.

10. An imaging chamber as defined in claim 1 wherein said electrophoretic particles are positively charged.

11. An imaging chamber as defined in claim 1 wherein said electrophoretic particles are negatively charged.

12. An imaging chamber as defined in claim 1 wherein said electrophoretic particles are electrically neutral.

13. An imaging chamber as defined in claim 1 including control means for cyclically actuating said imaging chamber to provide real time visual imaging and including means for energizing an X-ray source for a short portion of each cycle and simultaneously energizing an electric power source for attracting electrons and positive ions, and energizing a light source for viewing the deposited particles for a subsequent portion of the cycle.

14. An imaging chamber as defined in claim 13 wherein said control means includes means for connecting a relatively high voltage supply to said electrodes while the X-ray source is energized and then connecting a relatively low voltage supply to said electrodes.

15. An imaging chamber as defined in claim 14 wherein said control means includes means for connecting a voltage supply of reverse polarity prior to energizing the X-ray source.

16. An imaging chamber as defined in claim 13 wherein said control means includes means for connecting a voltage supply of reverse polarity prior to energizing the X-ray source.

17. An imaging chamber as defined in claim 1 including a dielectric layer at the surface of said first electrode facing said second electrode.

* * * * *